US005833803A

United States Patent [19]

Strohmeyer et al.

[11] Patent Number: 5,833,803

[45] Date of Patent: Nov. 10, 1998

[54] LOW PRESSURE ACTUATED LABELING APPARATUS

[75] Inventors: James J. Strohmeyer, Ballwin; Merlin Libby, Ferguson; Barry C. Gleeson, Chesterfield, all of Mo.

[73] Assignee: ESCO Electronics Corporation, St. Louis, Mo.

[21] Appl. No.: 759,785

[22] Filed: Dec. 3, 1996

[51] Int. Cl.[6] .............................. B32B 31/00; B41J 15/00; B65C 1/02; B65C 9/26

[52] U.S. Cl. .......................... 156/517; 156/387; 156/351; 156/358; 156/363; 156/556; 156/256; 156/277

[58] Field of Search .................................... 156/387, 519, 156/521, 517, 542, 256, 277, 351, 358, 363, 556; 137/625.43

[56] References Cited

U.S. PATENT DOCUMENTS

| | | | |
|---|---|---|---|
| 4,061,527 | 12/1977 | Traise | 156/519 |
| 4,171,239 | 10/1979 | Hirsch et al. | 156/461 |
| 4,612,078 | 9/1986 | Karp | 156/493 |
| 5,232,539 | 8/1993 | Carpenter et al. | 156/360 |
| 5,421,948 | 6/1995 | Crankshaw et al. | 156/486 |
| 5,458,729 | 10/1995 | Galchefski et al. | 156/566 |
| 5,478,428 | 12/1995 | Carpenter | 156/344 |
| 5,524,996 | 6/1996 | Carpenter et al. | 400/621 |
| 5,531,853 | 7/1996 | Cubow et al. | 156/521 |
| 5,560,293 | 10/1996 | Boreali et al. | 101/288 |
| 5,702,559 | 12/1997 | Bright | 156/450 |

*Primary Examiner*—David A. Simmons
*Assistant Examiner*—Linda L. Gray
*Attorney, Agent, or Firm*—Polster, Lieder, Woodruff & Lucchesi LC

[57] ABSTRACT

A low pressure actuated labeling apparatus (10) for printing, cutting, and applying labels (L) to articles (A) such as envelopes, packages and parcels. A printing unit (12) prints predetermined information on a label, the label being on a roll (13) of continuous label stock. A cutting unit (14) cuts the label from an end of the roll of stock after the label is printed. The cut label is deposited on a tamper unit (16) which transports the label from a first position (P1) adjacent the cutting unit to a second position (P2) adjacent the article and affixes the label to the article. The tamper unit includes an air supply system (50) for supplying high volume, low pressure air. The system applies a vacuum to the tamper unit during transport of the label by the tamper unit and a forced air pressure on the tamper unit at the second position for moving the tamper unit to apply the label to the article. The air supply means includes a valve means (54) and a blower means (52). A flow diverter means (58) rotates within a valve body (56) of the valve means to control the application of the vacuum and the air pressure to the tamper unit.

15 Claims, 6 Drawing Sheets

14
16
26
28
30
32
34
36
38
86
L
X
Y

LOW PRESSURE ACTUATED LABELING APPARATUS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

This invention relates to apparatus for printing, cutting, and applying labels to envelopes, packages, and other mail pieces or articles, and more particularly, to a high air volume, low pressure activated apparatus for printing and applying such labels.

It is not uncommon for people to whom envelopes, parcels, and other types of mail are sent to move from one address to another. When moving, these individuals often leave a record of their new address with the postal service responsible for mail delivery. The postal service records, for example, the name of the individual or business, their old address, and their new address. Subsequently, when a piece of mail processed by the postal service is being sent to a party's old address, the service can automatically print a label containing the party's new address and affix it to the piece of mail, so the mail is properly delivered to the new address.

In performing this service, it is important to be able to print a label which is readily affixed to envelopes, parcels, or other packages having of wide variety of sizes and shapes, and do so in a manner that ensures the label does not come off. One type of label used for this purpose is referred to as a linerless label. That is, a number of labels are provided on a roll with one side of the label being printed on, and with the other side being coated with an adhesive backing material for affixing each label to a mail piece. The label is called linerless because there is no backing strip covering the adhesive backing on the labels that has to be peeled away before the label can be applied.

A variety of machines have previously been constructed which can print and cut a label and then apply it to a piece of mail. Such a machine is shown, for example, in U.S. Pat. No. 5,524,996. Here, a linerless label material is drawn over a guide plate past a printhead where the label is printed. After a first portion is printed, the strip is advanced and a second portion is printed. The strip is then advanced and the first printed portion is cut from the strip. The strip is retracted to a position where a third portion of the strip can be printed. The strip is then advanced again, and the second printed portion of the strip cut off. The strip is then retracted so a fourth portion of the strip can be printed, and so on. As with this machine and other prior label printing and applicator machines, air pressure or vacuum pressure is used to control the positioning of a label for cutting, transport, and affixation to a mail piece. A high pressure air source is used in this regard and this requires that the facility where the machines are installed be equipped with such a high pressure source and that high pressure hoses or tubes be routed from this source to the machines and that the machines be equipped with high pressure hoses or tubes that can withstand this pressure. This not only increases the cost and complexity of the installation, but also reduces flexibility of the machines since they can only be used in those areas of the building near where high pressure lines are routed. Further, there are maintenance and repair problems associated both with the machine and the installation. Downtime caused by these problems reduces both the efficiency of the machines, slows mail delivery, and increases overall mail processing costs.

BRIEF SUMMARY OF THE INVENTION

Among the several objects of the present invention may be noted the provision of a low air pressure actuated labeling apparatus. Operation of the apparatus is such that an end label on a roll of labels is first printed, then cut off from the roll, transported from a first location to a second location, and then applied to a package, envelope, or other article at the second location.

Another object of the invention is to provide an apparatus usable with a linerless label material which can be printed on one side and have an adhesive on the other side for ready fixation of a label to a package, parcel, or envelope. The labels can be any of a variety of sizes with the apparatus still being able to readily print desired information on the one side of the label, cut the label, and transport the label, after it is severed from the strip, to the location where it is affixed.

A further object of the invention is the provision of apparatus usable by the postal service for printing and affixing labels to material processed by the service for delivery to individuals and businesses, but which has a wider application in being able to print any of a variety of labels and affix them to any of a variety of articles.

Another object of the invention is apparatus which employs a high volume, low pressure tamper. An air pressure source is self-contained within the apparatus so an external source of high pressure air is not required as it is with prior machines performing the same or similar functions. The structure which includes the self-contained low pressure air source requires no high pressure seals, and can tolerate small leaks. There are also no wear points so maintenance costs are further minimized. Use of a low pressure system allows the tamper assembly portion of the apparatus to be lightweight, readily movable, and precisely positionable during operation. And, the apparatus can be easily moved anywhere within an installation without regard to the proximity of high pressure air lines as required for use with the prior machines.

It is further a provision of the apparatus to use a simple roller and guide to move a strip of labels to a printing station and then to a cutting station, and to use plasma coated surfaces for those elements with which the adhesive side of the strip comes into contact, but to which it does not adhere. Also, the apparatus employs a cutting blade whose design produces a constant point of pressure during cutting, and the blade also has a relief design which prevents accumulation of adhesive material on the knife blade or surfaces adjacent the cutting edge when a label is cut.

Additional provisions of the apparatus include the use of stepper motors and solid state control circuitry for starting, stopping, and precisely moving and positioning various components of the apparatus to achieve accurate results. Further, the outer end of the tamper on which a label is carried is of a material conformable with the surface of the article to which a label is affixed. This allows the label to be affixed to rough surfaces, surfaces with creases or discontinuities, etc. The apparatus also includes sensors which sense the presence of an article to which a label is to be affixed, and a controller responsive to information from the sensors and other inputs to control operation of the apparatus and provide a smoothly functioning system of label printing and application.

Finally, it is a provision of the invention to provide a method by which a label is timely printed, easily cut and delivered to a transport, readily moved from one location to another and precisely positioned relative to a mail piece or other article, and securely affixed to the mail piece or article, the method being achieved using a low pressure, self-contained air system.

In accordance with the invention, generally stated, a low air pressure actuated labeling apparatus is used for printing labels which are then applied to envelopes, packages, parcels, and other articles. A continuous strip of linerless label material is moved past a printing unit at which predetermined information is printed on the label, the printing being done on a non-adhesive side of the label. The strip of material is then moved to a cutting station where the printed label is cut from the end of the roll. The cut label is deposited on the head of a tamper unit and then transported from a first position adjacent the cutting station to a second position adjacent the article to which the label will be applied. The label is then applied to the article. The tamper unit includes a self-contained high air volume, low air pressure system for sequentially applying a vacuum to the label during cutting and transport to maintain the label on the tamper unit, and a forced air pressure on a movable portion of the tamper unit, at the second position of the unit, to apply the label to the article. A method of printing, cutting, and applying a label to a mail piece or other article is also disclosed. Other articles and features will be in part apparent and in part pointed out hereinafter.

BRIEF DESCRIPTION OF THE SEVERAL VIEWS OF THE DRAWINGS

In the drawings.

FIGS. 9–11 are respective views of a self-contained low pressure, high air flow system of the apparatus used with the tamper unit in which FIG. 9 illustrates a quiescent operational state, FIG. 10 the operational state in which a label is drawn to and transported on a head of the tamper unit, and FIG. 11 the operational state in which a tamper head is moved to affix the label to a mail piece or article;

Corresponding reference characters indicate corresponding parts throughout the drawings.

DETAILED DESCRIPTION OF THE INVENTION

Figure 1:
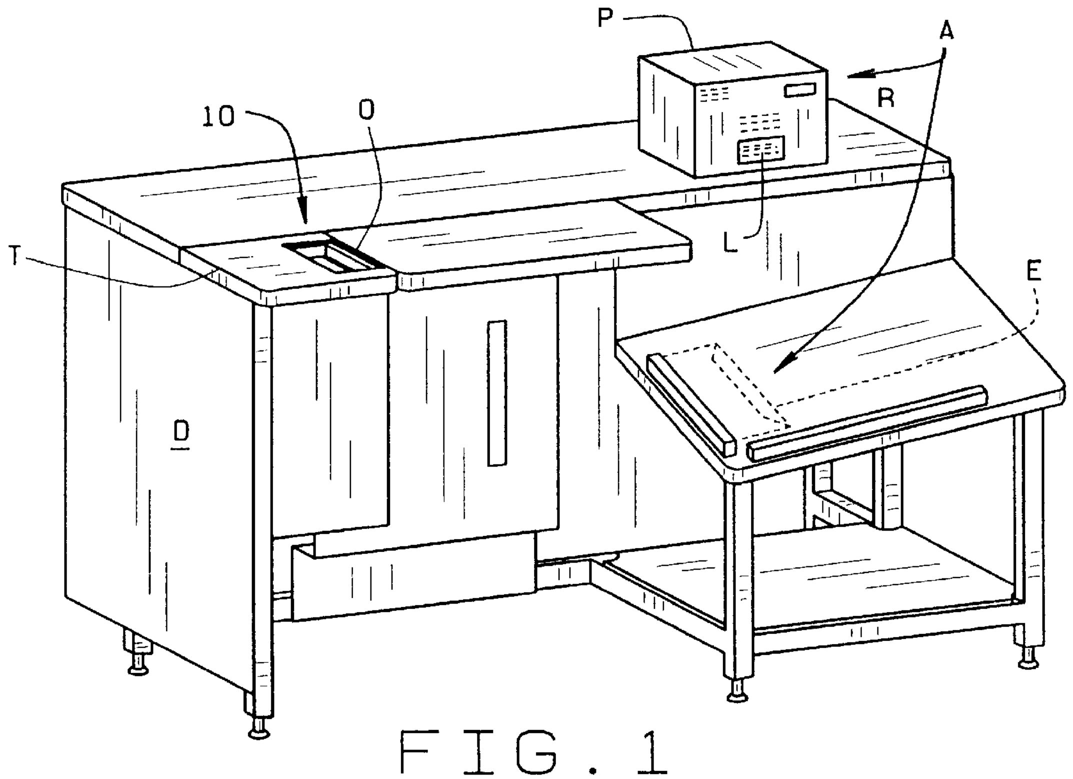
FIG. 1 is a perspective view of a desk in which the apparatus of the present invention is installed.
Figure 2A:
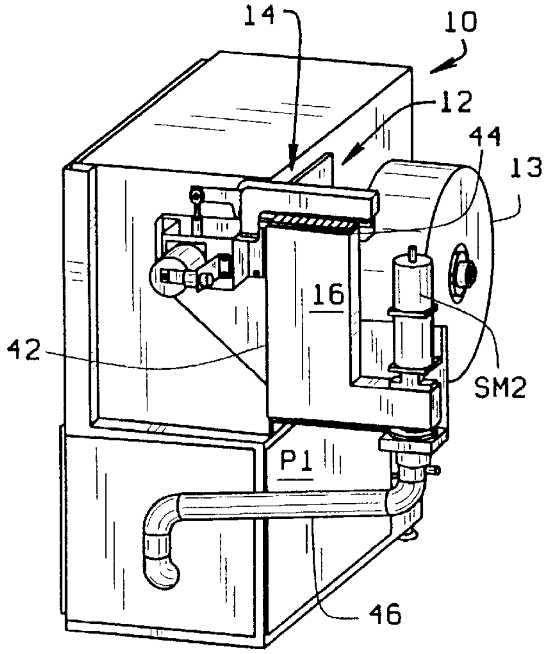
FIG. 2A is a perspective view of the apparatus of the invention in a first position in which a label is printed and cut from a strip of linerless label material.
Figure 2B:
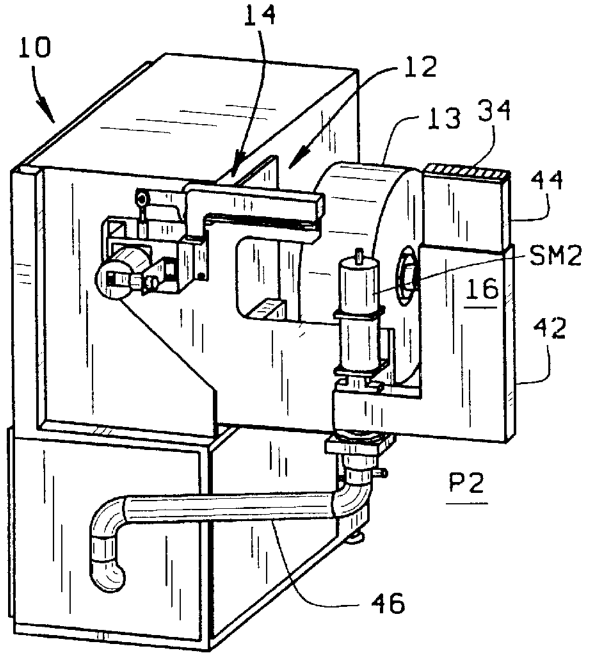
FIG. 2B is a similar view of the apparatus in which a tamper unit of the apparatus is moved to a position in which the label is affixed to a mail piece or other article.

Referring to the drawings, a low pressure actuated printing and labeling apparatus of the present invention is indicated generally 10 and is best shown in FIGS. 2A and 2B. In use, the apparatus is installed in a labeling desk D such as shown in FIG. 1. Such a desk is used for example, by postal services. A clerk sits at the desk and processes articles A such as mail pieces comprising envelopes E or packages or parcels P. The articles handled by the clerk are those which are addressed to a party who has moved from one address to another and whose new address is on record for mail forwarding purposes. The address R on the article is the old address and it is desired to conveniently forward the mail piece to the party at their new address. As is described hereinafter, apparatus 10 automatically prints a label L which is then applied to the article as shown in FIG. 1. It will be understood that while the description which follows relates to the printing and application of labels to pieces of mail, apparatus 10 is also usable in a wide variety of other applications for printing labels and applying them to articles, all without departing from the scope of the invention.

Figure 5:
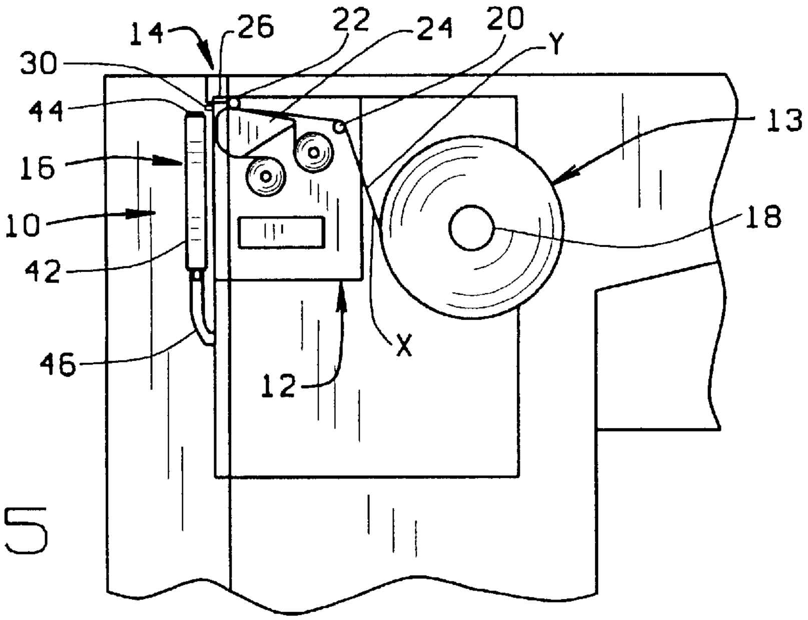
FIG. 5 is a front elevational view of the apparatus with the tamper unit in its position when a label is printed and cut.

Apparatus 10 consists of three basic components. The first is a printer unit indicated generally 12 for printing a label from a roll 13 of continuous label stock. As indicated in FIG. 5, one side of the label material is indicated X and has a surface upon which desired information can be printed by printer 12. The other side of the label is indicated Y and is coated or impregnated with an adhesive material by which printed and cut labels can be stuck onto articles such as the pieces of mail. The second component is a cutter unit 14 for cutting an individual label from the end of the continuous label stock after the label has been printed. The third component is a tamper unit 16 for transporting the cut label from a first position (P1 in the drawings) at which the label is deposited on the tamper unit after cutting, to a position P2 where the label is applied to the piece of mail.

Figure 3:
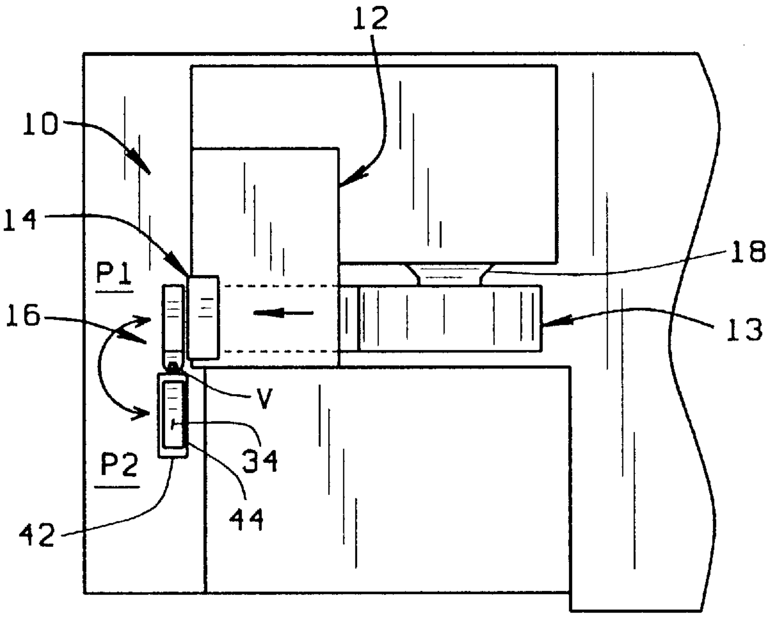
FIG. 3 is a top plan view of the apparatus illustrating the two positions of the tamper unit of the apparatus.
Figure 4:
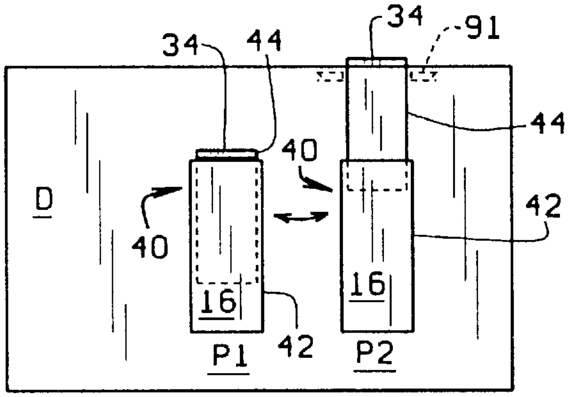
FIG. 4 is a side elevational view of the apparatus again illustrating the two positions of the tamper unit.

As shown in FIGS. 3 and 5, printer unit 12 first includes a label unwind including a post 18 on which a roll 13 of a continuous strip of labels is mounted. Next, the printer unit includes a post 20 and a roller 22 for unwinding the strip of labels off of the roll and over a printing head 24 of the printer. As shown in FIG. 5, roller 22 contacts the adhesive side Y of the linerless label material. To prevent the label material from sticking to the roller and jamming the apparatus, roller 22 is preferably a silicon rubber coated roller. The printer is a thermal printer and is a commercially available linerless label printer sold, for example, by Datamax Corporation under their model designation PE42LL. However, for purposes of this invention, any linerless label printer may be used so long as the label material is drawn to the printing head with the non-adhesive side X of the material facing the printing head. Further, the printer must accept label material of different widths and print information on an area (or footprint) which is adjustable depending upon the particular application with which the apparatus is used. In operation, printer 12 is responsible for drawing label material from the label roll, printing the desired information on the label material, and feeding the material forward a predetermined distance to the cutter.

Figures 6A, 6B, 7A, 7B, 8A, 8B:
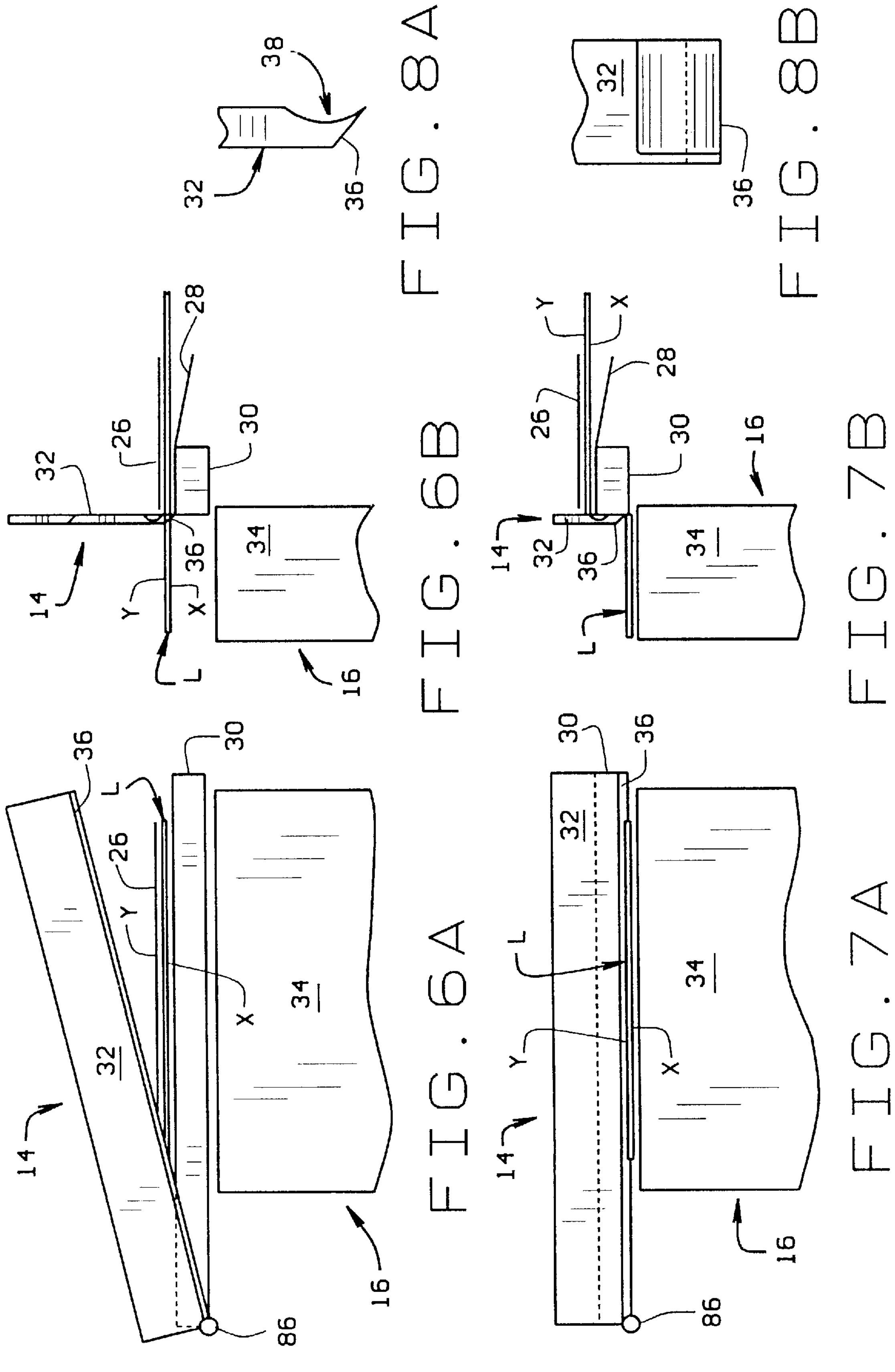
FIG. 6A is a side elevational view of a cutting assembly of the apparatus and a portion of the tamper unit.
FIG. 6B is a front elevational view thereof, both views showing the position of the assembly before a label is cut.
FIGS. 7A and 7B are similar views to FIGS. 6A and 6B after a label is cut.
FIG. 8A is a partial side elevational view of a knife blade used to cut labels.
FIG. 8B is a rear elevational view of the knife illustrating a relief portion thereof.

After printing a label, the end of the roll of label material is moved forwardly to the cutter unit. Cutter unit 14 accepts the printed label material from printer 12, cuts the material to a predetermined length, and places the cut label on tamper unit 16. As shown in FIG. 6B, the cutter unit has respective top and bottom label guides 26, 28 to direct the label material from printer 12 over an anvil 30. Top label guide 26 has a non-stick plasma coating to prevent adhesive side Y of the label from sticking to the guide. After the label material has been advanced a predetermined distance so the printed portion of the label extends beyond the anvil (see FIG. 6B), the label advance is halted. Now, and as shown in FIGS. 6A–7B, a sharpened blade 32 is brought down across the anvil to cut the label material and sever the end label from the roll. After cutting the end label, blade 32 continues past anvil 30 until it is in a horizontal position and adjacent to a head 34 of tamper unit 16. Adhesive side Y of the label sticks to the blade during its downward motion. Thus, as shown in FIGS. 7A and 7B, the blade actually delivers the cut label L to the head of the tamper unit. It is important to note that blade 32 applies a constant pressure on the label as it cuts the label from the end of the roll. Also, and as described hereinafter, a vacuum is drawn on the head 34 of the tamper unit at this time so to pull the label off the blade and onto the tamper unit for transport.

Referring to FIGS. 8A and 8B, blade 32 has a beveled edge 36. In addition, a relief 38 comprising a rectangular, concave depression is formed on the side of blade 32 facing the direction from which the label material is drawn across the anvil. Relief 38 is important because it prevents accumulation of adhesive coating material onto the blade which would otherwise occur as the backside of the blade wipes against the leading edge of the roll from which the label has just been cut. Such an accumulation, unless the blade were regularly cleaned or replaced, will cause irregular cutting of the labels including pulls and tears of the label material. By preventing this accumulation, clean, regular cuts will continue to be produced by the blade.

Tamper unit 16 is comprised of a two piece assembly 40. The assembly includes a cylinder 42 having an open and a closed end and an piston 44 reciprocal within the cylinder and extending through the open end of the cylinder. The outer end of the piston is comprised by the head 34. As indicated in FIG. 3, the cylinder portion of the assembly rotates about a fixed vertical axis V so the tamper unit can rotate between positions P1 and P2. In FIG. 5, a hose 46 is shown attached to the lower, closed end of the cylinder. The hose is attached to the cylinder so to be concentric with axis V and is connected to cylinder 42 so the cylinder can pivot freely about its connection to the hose. The other end of the hose is connected to an air supply means indicated generally 50 in FIGS. 9–11. Means 50 is a self-contained system within the apparatus for supplying high volume, low pressure air to the tamper unit. Accordingly, and unlike other previous types of label printers and applicators, apparatus 10 of the present invention does not require an external air or vacuum source with which to operate. This is particularly important because of flexibility in locating the apparatus within a work space, and for not requiring hoses, manifolds, external connectors, and the other equipment previous type units required. Importantly, use of self-contained air supply means 50 allows tamper unit 16 to be a lightweight piston and cylinder arrangement which is readily movable and precisely positionable.

Figure 9:
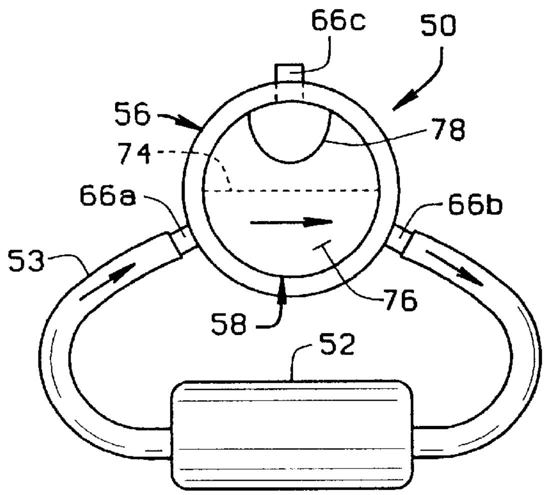
Figure 10:
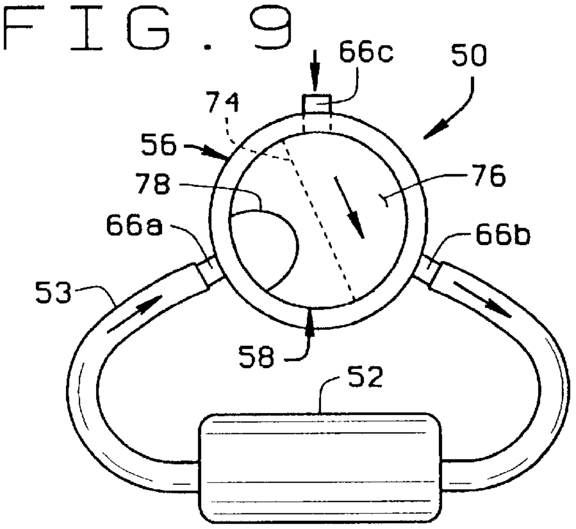
Figure 11:
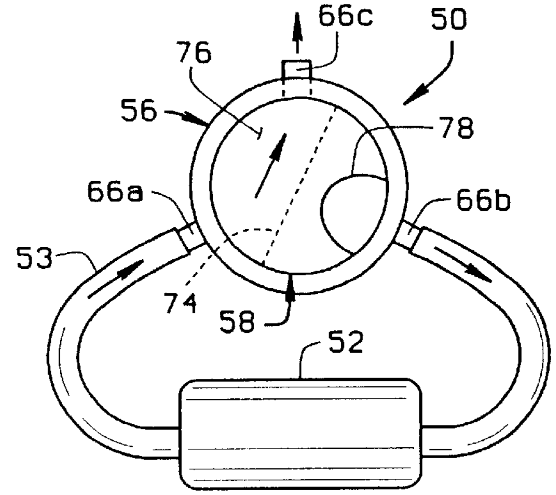

As is described hereinafter, air supply means 50 first applies a vacuum to head 34 of tamper unit 16 during the label cutting operation. It further applies a vacuum to the head during transport of the label by the tamper unit. It then applies an air pressure to head 34, when the tamper unit reaches its second position P2. This application of air pressure forces the piston out of the cylinder so head 34 can press the adhesive side of a printed label against an envelope, parcel, or other article. In FIGS. 9–11, air supply means 50 is shown to include a blower 52, a hose 53, and a valve assembly 54 including a multi-positionable valve. The vacuum and pressure used during the label transport and tamp process are generated through blower 52, which is a regenerative blower, and a multi-port valve of the valve assembly. Blower 52 is, for example, a Rotron Model DR083 regenerative blower. However, any regenerative blower could be used which supplies air at a volume and pressure equal to, or greater than, that provided by this model blower. As shown in FIG. 9, the valve is in a first or quiescent state position when the apparatus is in an idle state. In FIG. 10, with the valve in a second and vacuum producing position, tamper unit 16 accepts the label from the cutter 14 at position P1. With the valve maintained in this second position, the tamper unit transports the label to position P2. Finally, in FIG. 11, the valve is rotated to a third and air pressure producing position for applying the label (tamping it) to a mail piece.

In more detail, valve assembly 54 includes a valve body 56, a flow diverter 58 rotatable within the valve body, a motor 60 for rotating the flow diverter, and a motor mount 62. The valve body 56 is generally circular in cross-section and has central, circular bore 64 sized for the flow diverter to be received in the bore. Three ports 66*a*–66*c* are formed in a sidewall 68 of the valve body, the ports being spaced approximately 120° apart about the circumference of the valve body. One of these ports (66*c*) is connected to one end of tamper hose 46. The other two ports are connected to an intake and an exhaust of the blower.

Figure 12:
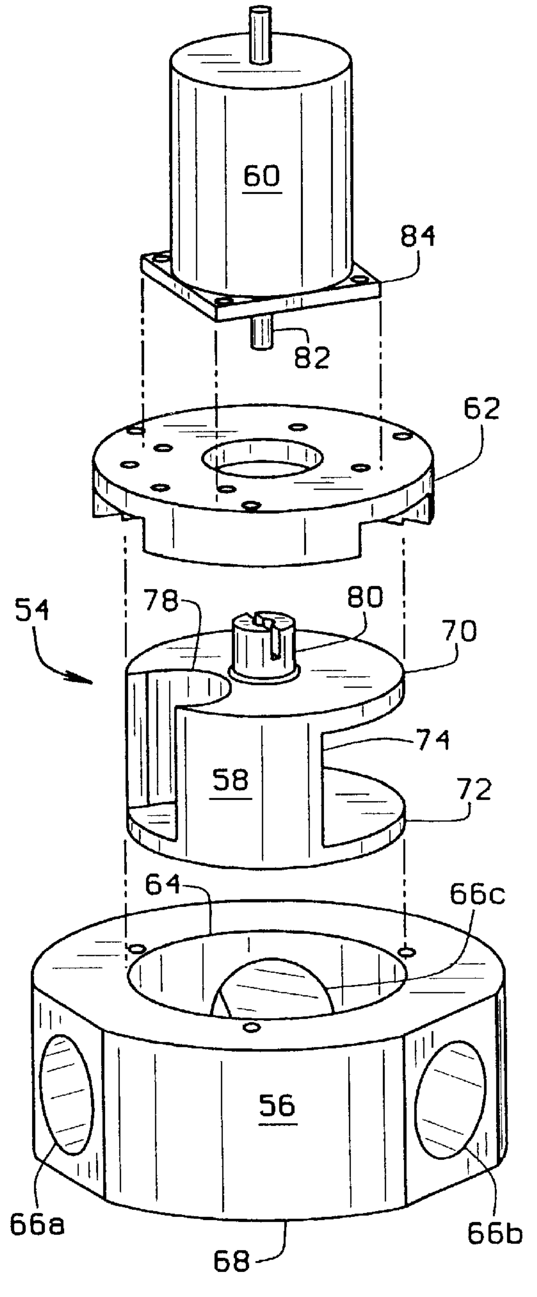
FIG. 12 is an exploded view of a valve assembly portion of the air flow assembly.

Flow diverter 58 comprises a circular element having respective upper and lower circular end walls 70, 72 each of which have an outer diameter corresponding to the diameter of bore 64. The height of the flow diverter generally corresponds to the height of valve body 56 for the flow diverter to be fit within the valve body. The flow diverter is also divided into sections by a central wall 74 extending across the diverter and dividing it in half. On one side of the wall, the flow diverter is completely open so the upper and lower walls 70, 72, wall 74, and the inner face of the valve body define a chamber 76. As shown in FIGS. 9–11, chamber 76 always connects between two of the three ports formed in the valve body. The remainder of the flow diverter is solid except for a hollowed out section indicated 78 in the drawings. The port in the valve body not opening into chamber 76 (regardless of the position of the flow diverter) opens into section 78. As shown in FIG. 12, the upper wall 70 of the flow diverter opens into section 78 for section 78 to form a vent which connects the remaining port of the valve (i.e., the port into which chamber 76 does not open) to the atmosphere.

Motor mount 62 comprises a circular cap piece which is attached to the top of the valve body, after the flow diverter is installed in place, by screws (not shown) or the like. A circular mount 80 projects above upper end wall 70. Mount 80 is slotted to receive a drive shaft 82 of motor 60. The motor has a rectangular mounting flange 84 by which the motor is secured to mount 62 again using screws (not shown). Motor 60 is a stepper motor and is used not only to rotate the flow diverter between the three positions within the valve housing as shown in FIGS. 9–11, but to also precisely position the flow diverter.

Figure 14:
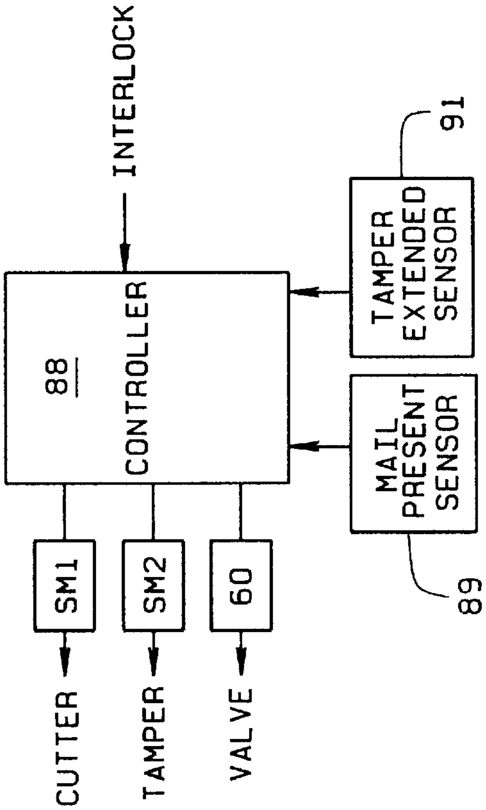
FIG. 14 is a simplified block diagram illustrating a controller portion of the apparatus and stepper motors operated by the controller; and, FIG. 15 is a flow diagram illustrating the operational sequence of the apparatus to print, cut, transport, and apply a label to a mail piece.

Apparatus 10 further includes two other stepper motors which are indicated SM1 and SM2 in FIG. 14. Stepper motor SM1 is operable to move blade 32 to cut a label from the end of the strip of continuous label material. As indicated in FIGS. 6A and 7A, one end of the blade is connected to an output shaft 86 of stepper motor SM1. A complete revolution of this stepper motor produces a complete down and up movement of the blade so the blade is moved to cut a label, and then withdrawn after the label is deposited on head 34 of the tamper unit. The other stepper motor SM2 is connected to cylinder 42 of assembly 40 and is operable in one direction to move tamper unit 16 between position P1 and position P2 after a label is deposited on head 34. The stepper motor SM2 is further operable to return the tamper unit back to its position P1 after the label has been affixed to a mail piece. All three stepper motors are operable by a controller 88 (see FIG. 14) which is responsive to the output of respective sensors 89 and 91 to operate the printing, cutting, transport, tamping, return, and retraction steps performed in accordance with the invention to affix a label to a mail piece. In FIG. 1, desk D is shown to include a table top T having a rectangular opening O formed in it. When an article A to which a label is to be affixed is placed over the opening, sensor 89, which detects a change in the intensity of light with an object covering the opening, provides a mail present indication to the controller. Subsequently, when piston 44 is extended to tamp the label onto the article, movement of head 34 through the opening is sensed by sensor 91 and another signal is supplied to the controller. It will be understood that other inputs (including an interlock) are supplied to the controller for use in operating the apparatus.

Referring again to FIG. 9, the initial orientation of the flow diverter relative to the valve body is shown with chamber 76 extending between ports 66*a* and 66*b* which are the respective exhaust and intake of blower 52. Vent 78 here connects to port 66*c* to vent cylinder 42 of tamper unit 16 to atmosphere. In this configuration, no vacuum or pressure is applied to the tamper unit. Rather, air simply circulates between the inlet and exhaust of the blower. As noted, this configuration represents a quiescent or passive state of operation of the apparatus such as occurs during those intervals when no article is identified as having to have a label printed and applied to it.

Figure 13B:
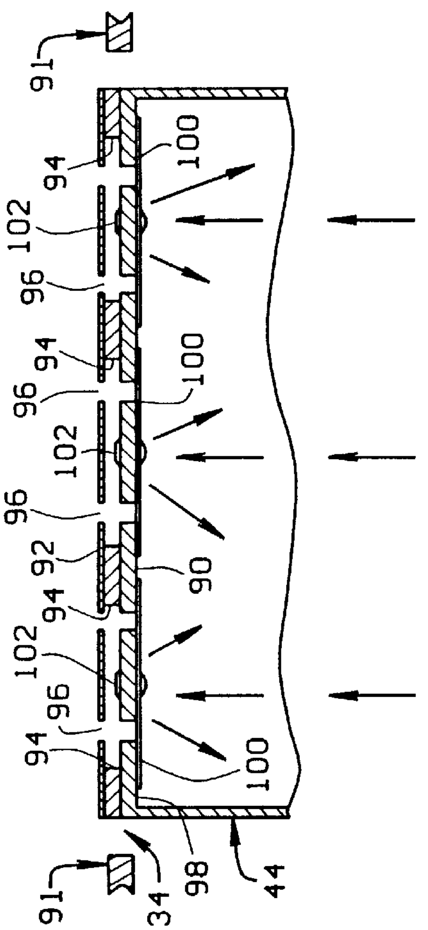
FIG. 13B is a similar view in which air pressure is applied to the head to move the head against a mail piece to affix the label to the mail piece.
Figure 13A:
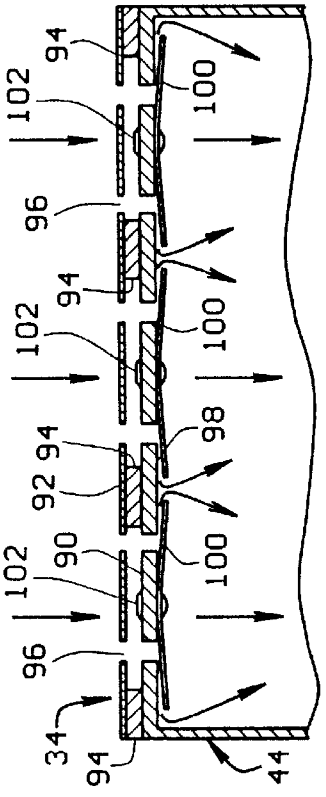
FIG. 13A is a partial sectional view of the head of the tamper unit and illustrates use of a partial vacuum to draw air into the head and draw and hold a label on the head for transport.
Figure 13C:
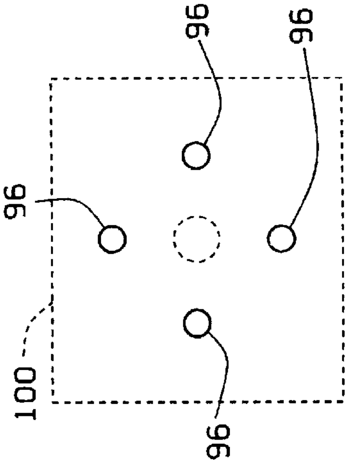
FIG. 13C is partial top plan view of the head illustrating a one-way valve incorporated into the head assembly for controlling air flow into the head.

In the configuration of FIG. 10 stepper motor 60 has been activated to rotate the flow diverter within the valve body so chamber 76 now extends between port 66*c* which extends to tamper unit 16, and port 66*b* which is the blower 52 intake. Vent 68 is now rotated so the blower exhaust is vented to the atmosphere. In this configuration, vacuum is applied to the tamper unit. As shown in FIGS. 13A–13C, head 34 of piston 44 has an inner face 90 and an outer face 92. The two face layers are separated by a flexible sealing element 94. A plurality of openings 96 are formed in head 34 and extend through both the inner and outer layers of the head. On the inner surface 98 of inner face 90, a plurality of one-way valves 100 are installed. Valves 100 comprise rectangular valve members each of which overlays a plurality of the holes 96 as shown in FIG. 13C. Each valve member is connected to inner face 90 of head 34 by a center pin connection 102. As shown in FIG. 13A, when the air supply means 50 configuration corresponds to that in FIG. 10, the airflow into the tamper unit is through the one-way valves 100 which are shown open. The resulting suction or vacuum is sufficient to draw the severed label away from the cutting blade and hold the label on the blade as the tamper unit moves between positions.

At the tamp position, stepper motor 60 again rotates flow diverter valve 58 so it is now in the FIG. 11 position. In this third orientation, chamber 56 now extends between exhaust port 66*a* of blower 52 and the port 66*c* to the tamper unit. With this orientation, atmospheric vent 78 is connected to the blower intake. In this configuration, and as shown in FIG. 13B, air pressure is applied to the tamper unit, and specifically to inner surface 98 of the inner layer of head 34. The air flow now forces the one-way valves 100 against the inner face 90 of the head closing the valves. The air pressure further causes piston 44 to move outwardly as shown in FIG. 2B to press the adhesive surface of the label against the envelope or parcel. It is a feature of the invention that head 34 is a flexible head, having an outer surface, as defined by the inner and outer faces 90, 92, and seal 94, which is readily conformable to the surface of the article against which a label is being tamped. Thus, even if the surface of the article is uneven, or has voids, operation of apparatus is such that the label is readily affixed to the article.

Sensor 91, which is, for example, an infrared sensor, detects the piston head when it reaches its tamp position. This detection initiates a return sequence in which stepper motor 60 sequentially moves the flow diverter back from its FIG. 11 position, to its FIG. 10 position. This is done to withdraw piston 44 back inside the cylinder so the tamper unit can now be rotated back from its position P2 tamping position to its original position P1. After piston 44 is withdrawn inside the cylinder, stepper motor 60 is operated to move flow diverter 58 back to its FIG. 9 position. Further, stepper motor SM2, once piston 44 is retracted within cylinder 42, rotates the assembly 40 back to its position P1 shown in FIG. 2A.

Figure 15:
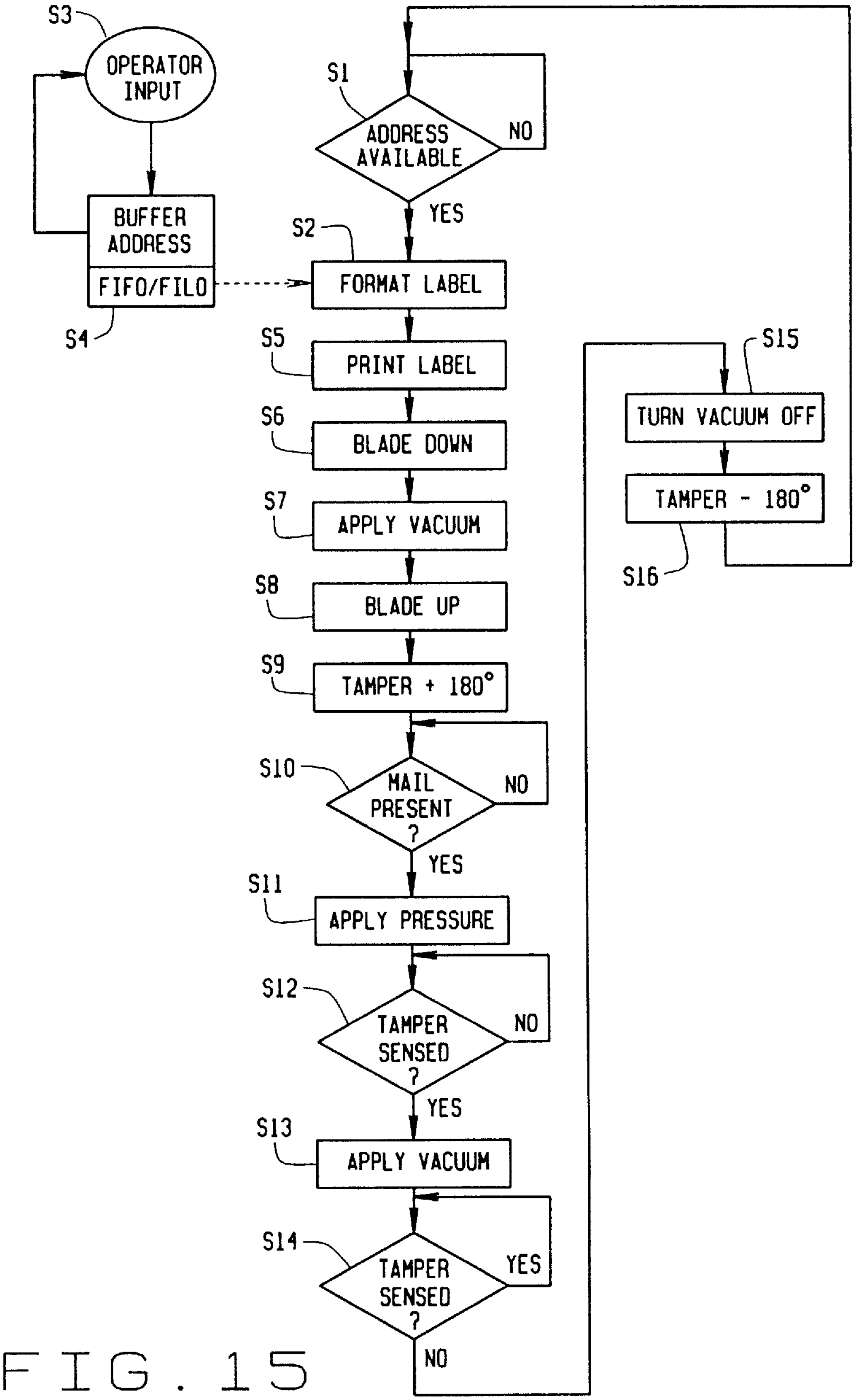

Finally, referring to FIG. 15, an operational sequence for apparatus 10 is shown with respect to the flow chart shown in the drawing. At step S1, when a piece of mail is to have a label with a forwarding address printed on it, a check is made of a memory storage to determine if the forwarding address is available. If it is, then the process proceeds to step S2. At this step, the information to be imprinted on a label L is formatted. As shown, a step S3 allows an operator to enter new, or one time, label information for printing a label. The operator can enter information for a series of labels into a buffer as indicated at step S4. When labels are printed using this information, the operator can select a first-in, first-out (FIFO), or a first-in, last-out (FILO) mode of taking label information from the buffer and printing it. The information is formatted as indicated by step S2 so the information will be printed in a desired sequence.

At step S5, the label is printed as previously described, and the roll of label material advanced so the printed label can be cut from the end of the roll. This is step S6 where bringing the blade down using stepper motor SM1 cuts the label from the end of the roll. When the label is cut, a vacuum is supplied by air supply means 50 to draw the cut label of the cutting blade and onto head 34 of the tamper unit. This is step S7. After the label is deposited on the tamper unit, the cutting blade is withdrawn back to its original position (step S8), and the tamper unit is rotated 180° by stepper motor SM2 (step S9) to move the unit from position P1 to position P2.

Now that the label has been printed, cut, and transported, the presence of a piece of mail onto which the label is to be applied is determined. This is step S10. Since placement of mail over opening O in desk D is not automatic, the tamper unit may dwell at its position P2 until the piece of mail is in place and its presence sensed by sensor 89. When the presence of an article is detected, pressure is applied to piston 44 as indicated at step S11. The piston now moves toward the article to tamp the label in place, and when it passes through the infrared field established by sensor 91, this passage is noted by the sensor as indicated at step S12.

After the tamping step, vacuum is again applied by the air supply means (step S13) in order to return piston 44 back into cylinder 42. To verify that this has been accomplished, sensor 91 is checked (step S14) to confirm that the head of the piston no longer impinges on the field established by the sensor. If it is not, then the vacuum is turned off (step S15) and stepper motor SM2 is operated to return the tamper unit back to its initial position P1 (step S16).

The operational sequence thus defined for apparatus 10 is to print a label, advance the label material, cut the printed label from the end of the roll, retract the roll, print a new label, advance the roll, cut off the newly printed label, etc. The advantage of this sequence is that it is a straightforward sequence and one that is readily implemented by the apparatus.

What has been described is a low pressure actuated labeling apparatus whose operation is such that an end label on a roll of linerless labels is first printed, then cut off from the roll, transported from a first location to a second location, and then applied to a package, envelope, or other article at the second location. The labels can be any of a variety of sizes and the apparatus will still print desired information on one side of the label, cut it, transport it, and affix it. The apparatus has a variety of uses not only by the postal service but in other applications where it is desirable to print labels at one location and transport them to another location for affixation to an article. Particular features of the apparatus are use of a high volume, low pressure tamper mechanism, and a self-contained low pressure air source which requires no high pressure seals and which can tolerate small leaks. Also, the tamper mechanism is lightweight, readily movable, and precisely positionable during operation. In addition, the apparatus uses a simple roller and guide to move labels to a printing station and a cutting station. Plasma coated surfaces are provided for those elements with which the adhesive side of the strip comes into contact. A uniquely designed cutting blade provides a constant point of pressure during cutting and also does not accumulate adhesive material. Stepper motors and solid state control circuitry are used for precisely moving and positioning various parts of the apparatus to accurately locate and place the labels. A tamper head of conformable material allows a label to be affixed to rough or uneven surfaces. Sensors sense the presence of a mail piece to which a label is to be affixed, and a controller uses the sensors' and other inputs to control operation of the apparatus and provide a smoothly operating device. As a method, the invention provides timely printing and easy cutting of a label, delivery of the label to a mail piece or other article, and secure affixation of the label to the mail piece or article.

In view of the foregoing, it will be seen that the several objects of the invention are achieved and other advantageous results are obtained.

As various changes could be made in the above constructions without departing from the scope of the invention, it is intended that all matter contained in the above description or shown in the accompanying drawings shall be interpreted as illustrative and not in a limiting sense.

Having thus described the invention, what is claimed and desired to be secured by Letters Patent is:

1. A low pressure actuated labeling apparatus for printing, cutting, and applying labels to articles, the apparatus comprising:

a print means for printing predetermined information on a label, said label being on a roll of a continuous label stock;

a cutting means for cutting said label from an end of said roll of stock after said label has been printed;

a tamper means for receiving said cut label, for transporting said cut label from a first tamper means position adjacent said cutting means to a second position adjacent an article, and for applying said cut label to said article, said tamper means including a head on which said cut label is deposited for transport and from which said cut label is applied to the article, said head having a plurality of openings therein through which a vacuum is applied to hold the cut label on the head; and, an air supply means for supplying high volume, low pressure air to said tamper means, said air supply means first applying said vacuum to said tamper means during cutting of said label and transport of said cut label and then applying air pressure to said tamper means when said tamper means reaches said second position for moving said tamper means to apply said cut label to said article, said air supply means including (a) a valve means and (b) a blower means for applying said vacuum through said openings for holding said cut label on said head and for applying said air pressure to force said head in the direction of said article, said valve means including (aa) a multi-position valve body having an inlet attached to said blower means and an outlet attached to said blower means and (bb) a flow diverter means movable within said valve body for producing said vacuum applied to said tamper means when said flow diverter means is moved to one position and for applying said air pressure to said tamper means when said flow diverter means is moved to a different position, said label having a non-adhesive surface upon which said printing means prints and an adhesive surface, said cut label being deposited and held on said head with said printed surface adjacent said head and said adhesive surface facing away from said head, for said adhesive surface to adhere to said article when said cut label is forced thereagainst.

2. The apparatus of claim 1 wherein said tamper means includes a cylinder and a piston movable within said cylinder, said piston comprising the head on which said cut label is deposited for transport from said first position to said second position.

3. The apparatus of claim 2 wherein said tamper means is rotatable about a fixed axis between said first position and said second position, said piston being in a retracted position within said cylinder when said tamper means is at said first position and during movement of said tamper means between said first position and said second position.

4. The apparatus of claim 1 wherein said air supply means is self-contained within said apparatus.

5. The apparatus of claim 1 further including a motor means connected to said flow diverter means for moving said flow diverter means to said one position and to said different position.

6. The apparatus of claim 5 further including a plurality of air flow control valve members mounted on said head adjacent said openings.

7. The apparatus of claim 6 wherein each of said air flow control valve members are one-way valves.

8. The apparatus of claim 7 further including means for attaching each of said valve members to said head for said openings in said head to be covered by said valve members, said valve members being sufficiently flexible so to be drawn away from said openings when said flow diverter means is in said one position by which said vacuum is applied to said tamper means, said vacuum being applied when said cut label is to be deposited on said tamper means and transported thereon from said first position to said second position, and said valve members being forced against said head to close said openings when said air pressure is applied to said tamper means to apply said cut label to said article.

9. The apparatus of claim 5 further including a control means for controlling operation of said motor means to sequentially move said flow diverter means from a first and quiescent state position in which no said vacuum or said air pressure is applied to said tamper means, to said one position in which said vacuum is applied to said tamper means, and to said different position in which said air pressure is applied to said tamper means, said control means then returning said flow diverter means from said different position back to said first and quiescent state position after said cut label is applied to said article.

10. The apparatus of claim 9 further including a sensing means for sensing when said article is in a position at which said cut label can be applied thereto.

11. The apparatus of claim 10 further including a means for sensing movement of said tamper means to apply said cut label to said article.

12. The apparatus of claim 1 wherein said cutter means includes an anvil upon which said end portion of said roll of labels sets after said label is printed, the printed label extending past said anvil, and a cutting blade movable relative to said anvil for cutting said printed label from the end of said roll.

13. The apparatus of claim 12 wherein said blade has a cutting edge to which the severed end of said label adheres as it is cut by said blade, said blade applying a constant pressure on said label as it cuts said label from the end of said roll, and said tamper means being positioned with respect to said blade so that as said blade cuts said label, said label is drawn toward said tamper means, said air supply means producing said vacuum in said tamper means creating a suction force on said label to peel said label from said blade and hold said cut label on said tamper means for transport to said second position.

14. The apparatus of claim 13 wherein said blade has a relief formed in a face adjacent a direction from which said label is advanced from said printing means to said cutting means, said relief preventing said blade from accumulating adhesive material as said blade successively cuts said labels from said roll.

15. The apparatus of claim 1 wherein said article has an uneven surface and said head is formed of a material conformable to the surface of said article.

* * * * *